(12) United States Patent
Nguyen

(10) Patent No.: US 6,467,506 B1
(45) Date of Patent: Oct. 22, 2002

(54) COOLING SYSTEM FULLY VISIBLE TESTER

(76) Inventor: Thanh V. Nguyen, 3859-43rd St., San Diego, CA (US) 92105

( * ) Notice: Subject to any disclaimer, the term of this patent is extended or adjusted under 35 U.S.C. 154(b) by 0 days.

(21) Appl. No.: 08/984,916

(22) Filed: Dec. 4, 1997

(51) Int. Cl.⁷ .............................. F16L 55/00; F01P 7/14
(52) U.S. Cl. ........................... 138/104; 138/77; 285/4; 285/93; 116/276; 123/41.1; 123/41.15
(58) Field of Search .................................. 138/104, 103, 138/177, 178; 165/11.1; 116/279; 123/41.15, 41.1; 285/3, 4, 148.18, 142.25, 93

(56) References Cited

U.S. PATENT DOCUMENTS

| | | | |
|---|---|---|---|
| 1,873,632 A | * 8/1932 | Peterson | 165/11.1 X |
| 2,449,754 A | * 9/1948 | Seitz | 285/111 |
| 2,995,151 A | * 8/1961 | Lockwood | 138/121 |
| 3,054,391 A | * 9/1962 | Rocklen | 123/41.15 |
| 3,499,481 A | * 3/1970 | Avrea | 165/11.1 |
| 3,601,181 A | * 8/1971 | Avrea | 165/104.32 X |
| RE27,965 E | * 4/1974 | Avrea | 165/11.1 |
| 3,866,950 A | * 2/1975 | Skoch et al. | 285/4 |
| 3,995,888 A | * 12/1976 | McIlroy | 285/4 |
| D282,962 S | * 3/1986 | Gerber | D23/43 |
| 4,597,594 A | * 7/1986 | Kacalieff et al. | 285/239 |
| D290,646 S | * 6/1987 | Cook | D23/43 |
| 4,703,956 A | * 11/1987 | Keech | 285/156 |
| 4,753,289 A | * 6/1988 | Avrea | 165/104.32 |
| 4,785,874 A | * 11/1988 | Avrea | 165/104.32 |
| 4,790,369 A | * 12/1988 | Avrea | 165/104.32 |
| 4,874,370 A | * 10/1989 | Heimerl et al. | 285/4 X |
| 5,044,430 A | * 9/1991 | Avrea | 165/104.32 |
| 5,141,255 A | * 8/1992 | Hanaoka | 285/4 |
| 5,279,264 A | * 1/1994 | Simmons et al. | 123/41.1 |
| 5,635,058 A | * 6/1997 | Bowman | 137/216 |
| 5,653,264 A | * 8/1997 | Atkinson | 138/104 X |
| D441,435 S | * 5/2001 | Patteson et al. | D23/262 |

* cited by examiner

*Primary Examiner*—Patrick Brinson
(74) *Attorney, Agent, or Firm*—Donn K. Harms; John R. Duncan

(57) ABSTRACT

An elongated clear fluid orifice device which includes a plurality of different exterior widths for accommodating the mounting of different sized hoses thereon while having a constant interior width. The device may be used in any liquid cooled engine having heated fluid flowing therethrough. The device is best made pressure resistant and high temperature resistant polycarbonate material such as EMS Grliamid TR-55 (clear nylon) compound and having an interior fluid tube with a cylindrical center section having a predetermined, constant interior width. The exterior tube levels have a raised ridge at each level to assist in securing a clamp to hold the hose in place at each level.

4 Claims, 1 Drawing Sheet

COOLING SYSTEM FULLY VISIBLE TESTER

FIELD OF THE INVENTION

This invention relates to a new device tool for the cooling system and fully visible of water level in the radiator while the engine is running and the temperature of water is getting hot. Said invention is easy to install, remove, and clean from the radiator hose. Said invention was built with the notch in three different sizes fitting most radiator hoses. Said invention will prevent the wrong estimate or diagnosis from the mechanics or the consumers which can lead to damage to the engine and the automatic transmission.

BACKGROUND OF THE INVENTION

The cooling system devices heretofore developed with material apply for automotive engines who have old design for cooling system. These were made by woven glass hose, polyvinyl hose, and plastic. Currently used material only holds and supports the fluid temperature up to 185 F. degree. If the fluid gets too hot, these materials will melt and damage the system. Further, some prior art simply used a long hose or long tube to replace the whole rubber hose and it was expensive to install since they required special mounting provisions as well as additional hoses and fittings.

SUMMARY OF THE INVENTION

This present invention tool will check the coolant system without opening the radiator cap while the engine temperature is hot. The disclosed device provides the most safety and fully visible inspection device insertable in cooling system hoses where the temperature of the coolant goes up to 350 degrees. There are two ways to install the disclosed device in the radiator hose. First, use a short radiator hose and connect it to the neck or top inlet of the radiator. Then connect the device tool with the radiator with the two heads of the radiator hoses and secure it by using hose clamps at both sides.

Second, cut the radiator hose and connected it with the disclosed device inserted in the resulting gap, and secure it therein by using hose clamps on both sides.

DESCRIPTION OF THE PREFERRED EMBODIMENT

Figure 1:
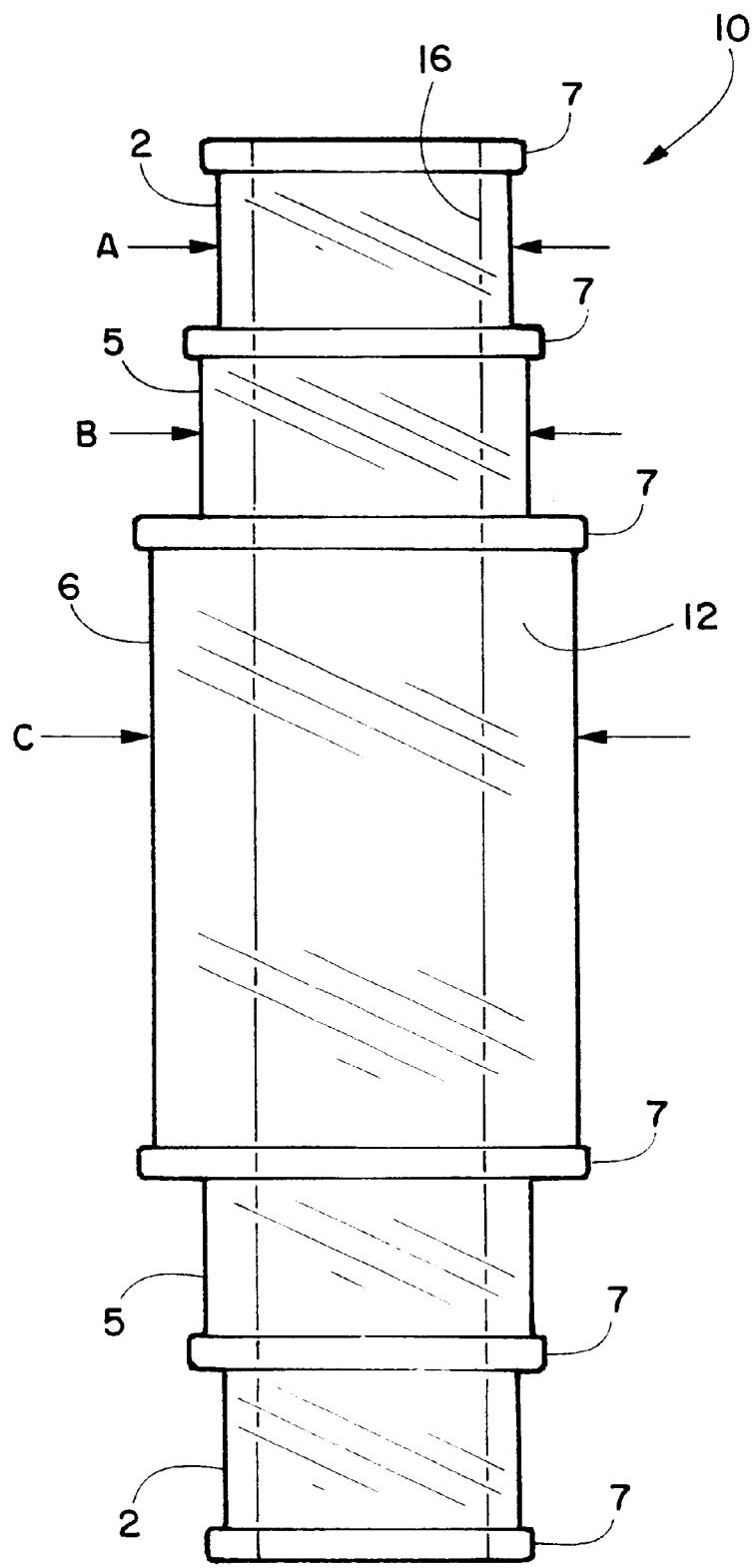
FIG. 1 is a pictorial view of the transparent tube with a plurality of three different sized exterior notches.

The device 10 is composed of a transparent tube 12 which provides the most safety and full observation of the quantity and quality of the coolant circulating in a cooling system when the temperature of the liquid is getting hot. This transparent tube 12 can be used for diagnosis of problems in the cooling system, such as visibly checking the cooling level, verifying coolant circulation, water pump activity, thermostat operation, radiator flow, coolant condition, and easy viewing from the exterior of the device 10 for contaminants in the coolant such as the presence of bubbles or air traps in the cooling system. It helps mechanics or consumers avoid repair costs for engines when the engines get overheated due to lack of water from the cooling system. This problem can lead to damage to the automatic transmission due to a burned-up torque converter or friction clutch.

The transparent tube 12 is easy to install, use, and remove, from a conventional radiator hose. The transparent tube 12 could apply as an entirely new design of water cooling systems because in the current best mode it was built with clear polycarbonate materials currently EMS Grliamid TR-55 (clear nylon) compound to support simultaneous compression from the fluid stream and which will resist fluid temperatures over 500 degrees which is required when the device 10 is inserted into vehicle cooling systems which conventionally hold fluid temperatures which can reach over 350 degrees.

The transparent tube 12 as shown in the preferred embodiment of FIG. 1 has multiple exterior widths shown at A, B, and C, providing multiple circumferences. In the current best mode the they would be sized to accommodate attachment to three sizes or more of conventional radiator hoses (not shown) which would engage around the differing diameter of the exterior at surfaces 2, 5, and 6. In the current best mode of the device 10 at the beginning and end of each width change, is situated a raised ridge 7 which encircles the exterior surface of the device and aids in securing a hose thereon. The ridge 7 rises in the current best mode about $\frac{1}{10}$ of an inch above the adjacent wider section of the exterior of the device 10 wherein is situated.

The device 10 in the current best mode has a substantially constant inner diameter as depicted in FIG. 1 in phantom line showing the interior passage 16 substantially constant through the entire center section of the device 10. When installed into the radiator hose of a coolant system the device 10 has application for testing and monitoring the coolant fluids used in automobile radiators, boats, or any related cooling systems.

While the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth.

What is claimed is:

1. A transparent tube for use in a radiator hose in a liquid cooled engine to permit direct observation of cooling liquid level and quality, which comprises:

a substantially rigid transparent tube;

said tube formed in a unitary construction from thermoplastic resin;

said tube having a generally cylindrical center section having predetermined inside and outside diameters;

said inside diameter of said tube being substantially constant in size; and at least one step at each end of said center section, said steps being generally cylindrical and having predetermined outside diameters less than said outside diameter of said center section; whereby a section of said radiator hose may be cut out within said hose and said end steps may be inserted into said radiator at said split.

2. The tube according to claim 1 wherein at least two of said steps, of decreasing diameter away from said center section, are provided at each end of said center section.

3. The tube according to claim 1 wherein an outward raised ridge is provided on each step adjacent the step end opposite said center section.

4. A method of permitting direct observation of liquid coolant level and condition in a liquid cooled engine of the type having a radiator and hoses for directing liquid into and out of the radiator, where during normal engine operation at least one hose will have a fluid level, which comprises the steps of:

providing a generally cylindrical transparent thermoplastic tube of unitary construction, having a generally cylindrical center section of predetermined length and having a substantially constant internal diameter, and having generally cylindrical, stepped end portions of diameter approximately equal to the inside diameter of said hose;

cutting a section out of said one of said hoses, said section being removed from a viewable position on said hose, said section forming a length approximately equal to the length of said center section and centered at about said normal fluid level in said hose;

inserting said stepped end portions into the hose in place of said cut out section; and applying clamping means over said hose and stepped end portions to hold said tube in place.

* * * * *